(12) United States Patent
Ren

(10) Patent No.: US 11,521,300 B2
(45) Date of Patent: Dec. 6, 2022

(54) EDGE PRESERVING NOISE REDUCTION ALGORITHM USING INVERSE EXPONENTIAL FUNCTION OPTIMIZATION

(71) Applicant: Ambarella International LP, Santa Clara, CA (US)

(72) Inventor: Keke Ren, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 193 days.

(21) Appl. No.: 17/138,046

(22) Filed: Dec. 30, 2020

(65) Prior Publication Data

US 2022/0188983 A1 Jun. 16, 2022

(30) Foreign Application Priority Data

Dec. 14, 2020 (CN) .......................... 202011470120.X

(51) Int. Cl.
*G06T 5/00* (2006.01)
*G06T 5/20* (2006.01)
*G06T 1/20* (2006.01)

(52) U.S. Cl.
CPC ................ *G06T 5/002* (2013.01); *G06T 1/20* (2013.01); *G06T 5/20* (2013.01); *G06T 2207/10016* (2013.01); *G06T 2207/10024* (2013.01); *G06T 2207/20192* (2013.01)

(58) Field of Classification Search
CPC .. G06T 5/002; G06T 1/20; G06T 5/20; G06T 2207/10016; G06T 2207/10024; G06T 2207/20192
See application file for complete search history.

(56) References Cited

U.S. PATENT DOCUMENTS

| | | | |
|---|---|---|---|
| 8,953,882 B2 * | 2/2015 | Lim ..................... | H04N 17/002 348/241 |
| 9,299,131 B2 * | 3/2016 | Toda ....................... | G06T 5/002 |
| 10,038,862 B2 * | 7/2018 | Yu ............................. | G06T 5/20 |
| 10,530,995 B2 * | 1/2020 | Douady-Pleven ..... | H04N 5/232 |
| 10,776,126 B1 * | 9/2020 | Kohn ..................... | G06F 9/5044 |
| 10,929,945 B2 * | 2/2021 | Lim ................... | H04N 1/00832 |
| 11,361,410 B2 * | 6/2022 | Wen ....................... | G06T 5/009 |
| 2016/0055608 A1 * | 2/2016 | Frascati ................ | G06T 15/005 345/522 |
| 2017/0280073 A1 * | 9/2017 | DeBattista ............. | G06T 5/002 |
| 2020/0053377 A1 * | 2/2020 | Wang ................... | H04N 19/513 |
| 2020/0342579 A1 * | 10/2020 | Lin .......................... | G06T 7/50 |
| 2020/0396398 A1 * | 12/2020 | Romanenko ......... | G06K 9/0051 |

* cited by examiner

*Primary Examiner* — Andrae S Allison
(74) *Attorney, Agent, or Firm* — Christopher P. Maiorana, PC

(57) ABSTRACT

An apparatus includes a memory and a processing circuit. The memory may be configured to store image data of an image. The processor circuit may be configured to (a) copy the image data of the image from the memory to a first memory buffer of the processor circuit, (b) calculate first vector values for each pixel location in the image using the image data stored in the first memory buffer, (c) calculate second vector values for each pixel location in the image using the image data stored in the first memory buffer and the first vector values, (d) transform the image data stored in the first memory buffer by adding the second vector values to corresponding image data, (e) storing the transformed image data to the memory, and (f) repeating steps (a) through (e) until the image data of the image has been transformed.

19 Claims, 9 Drawing Sheets

EDGE PRESERVING NOISE REDUCTION ALGORITHM USING INVERSE EXPONENTIAL FUNCTION OPTIMIZATION

This application relates to Chinese Application No. 202011470120.X, filed Dec. 14, 2020, which is incorporated by reference in its entirety.

FIELD OF THE INVENTION

The invention relates to image processing generally and, more particularly, to a method and/or apparatus for implementing an edge preserving noise reduction algorithm using inverse exponential function optimization.

BACKGROUND

Traditionally, noise in an image is reduced by running Gaussian smooth or average smooth filtering. Although the traditional filtering technique suppresses the noise, object edges are also blurred by the traditional filtering technique. Existing edge preserving noise reduction algorithms utilize a bilateral filter and a guide filter. The bilateral filter uses a non-linear filter kernel resulting in high computational complexity. The guide filter needs to set parameters to adapt to variant image scenarios, which limits its application. Because both the bilateral filter and the guide filter involve large amounts of non-linear calculations, it is difficult to fully deploy these algorithms to intensive computing accelerators.

It would be desirable to implement an edge preserving noise reduction algorithm using inverse exponential function optimization.

SUMMARY

The invention encompasses an aspect concerning an apparatus comprising a memory and a processing circuit. The memory may be configured to store image data of an image. The processor circuit may be configured to (a) copy the image data of the image from the memory to a first memory buffer of the processor circuit, (b) calculate first vector values for each pixel location in the image using the image data stored in the first memory buffer, (c) calculate second vector values for each pixel location in the image using the image data stored in the first memory buffer and the first vector values, (d) transform the image data stored in the first memory buffer by adding the second vector values to corresponding image data, (e) store the transformed image data to the memory, and (f) repeat steps (a) through (e) until the image data of the image has been transformed.

In some embodiments of the apparatus aspect described above, the processor circuit is further configured to repeat steps (a) through (f) on the transformed image data for a predetermined number of iterations.

In some embodiments of the apparatus aspect described above, the processor circuit is further configured to store the transformed image data in a second memory buffer for output as a result image.

In some embodiments of the apparatus aspect described above, the processor circuit comprises a plurality of hardware engines configured to perform one or more operators. In some embodiments where the processor circuit comprises the plurality of hardware engines, the one or more operators include a fast convolution operator, a multiply-add operator, and a transcendental operator. In some embodiments where the processor circuit comprises the plurality of hardware engines, the processor utilizes the fast convolution operator to perform gradient computations for calculating the first vector values for each pixel location in the image. In some embodiments where the processor circuit comprises the plurality of hardware engines, the processor utilizes the multiply-add operator to perform element-wise multiplications and summations for calculating the first vector values for each pixel location in the image. In some embodiments where the processor circuit comprises the plurality of hardware engines, the processor circuit utilizes the transcendental operator to perform exponential and division computations for calculating the first vector values for each pixel location in the image.

In some embodiments of the apparatus aspect described above, the transformed image data has reduced noise and preserve object edges.

In some embodiments of the apparatus aspect described above, the memory and the processor circuit are implemented as part of a camera system on chip.

In some embodiments of the apparatus aspect described above, the image comprises at least one of a thermal image and a time-of-flight image.

The invention also encompasses an aspect concerning a method of reducing noise in a captured image comprising the steps of copying image data of an image to a first memory buffer, calculating first vector values for each pixel location in the image using the image data stored in the first memory buffer, calculating second vector values for each pixel location in the image using the image data stored in the first memory buffer and the first vector values, transforming the image data stored in the first memory buffer by adding the second vector values to the corresponding image data, and storing the transformed image data in a second memory buffer for output as a result image.

In some embodiments of the method aspect described above, the method further comprises performing a predetermined number of iterations of calculating the first vector values for each pixel location in the image using the image data stored in the first memory buffer, calculating the second vector values for each location in the image using the image data stored in the first memory buffer and the first vector values, and transforming the image data stored in the first memory buffer by adding the second vector values to the corresponding image data.

In some embodiments of the method aspect described above, transforming the image data stored in the first memory buffer by adding the second vector values to corresponding image data reduces noise in the image data while preserving edges of objects.

In some embodiments of the method aspect described above, the transforming the image data stored in the first memory buffer by adding the second vector values to the corresponding image data reduces fixed pattern noise in the image data while preserving edges of objects.

In some embodiments of the method aspect described above, the image comprises at least one of a thermal image and a time-of-flight image.

In some embodiments of the method aspect described above, calculating the first vector values for each pixel location in the image using the image data stored in the first memory buffer comprises calculating gradient vectors for each pixel location in the image using the image data stored in the first memory buffer. In some embodiments calculating the first vector values for each pixel location in the image using the image data stored in the first memory buffer further comprises calculating a sum of squares of the gradient vector values for each pixel location in the image stored in the first memory buffer. In some embodiments, calculating the first vector values for each pixel location in the image using the image data stored in the first memory buffer further comprises calculating a vector representing an inverse exponential function of the sum of the squares of the gradients at each pixel location of the image.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing an edge preserving noise reduction filter algorithm that may (i) suppress noise while maintaining object edges, (ii) use inverse exponential function optimization, (iii) be implemented as an iterative process, (iv) have lower computational complexity than conventional techniques, (v) have fewer configuration parameters than conventional techniques, (vi) provide easy hardware acceleration deployment, (vii) achieve good image quality, (viii) be utilized for thermal and/or time-of-flight images, (ix) handle fixed pattern noise, and/or (x) be implemented as one or more integrated circuits.

Figure 1:
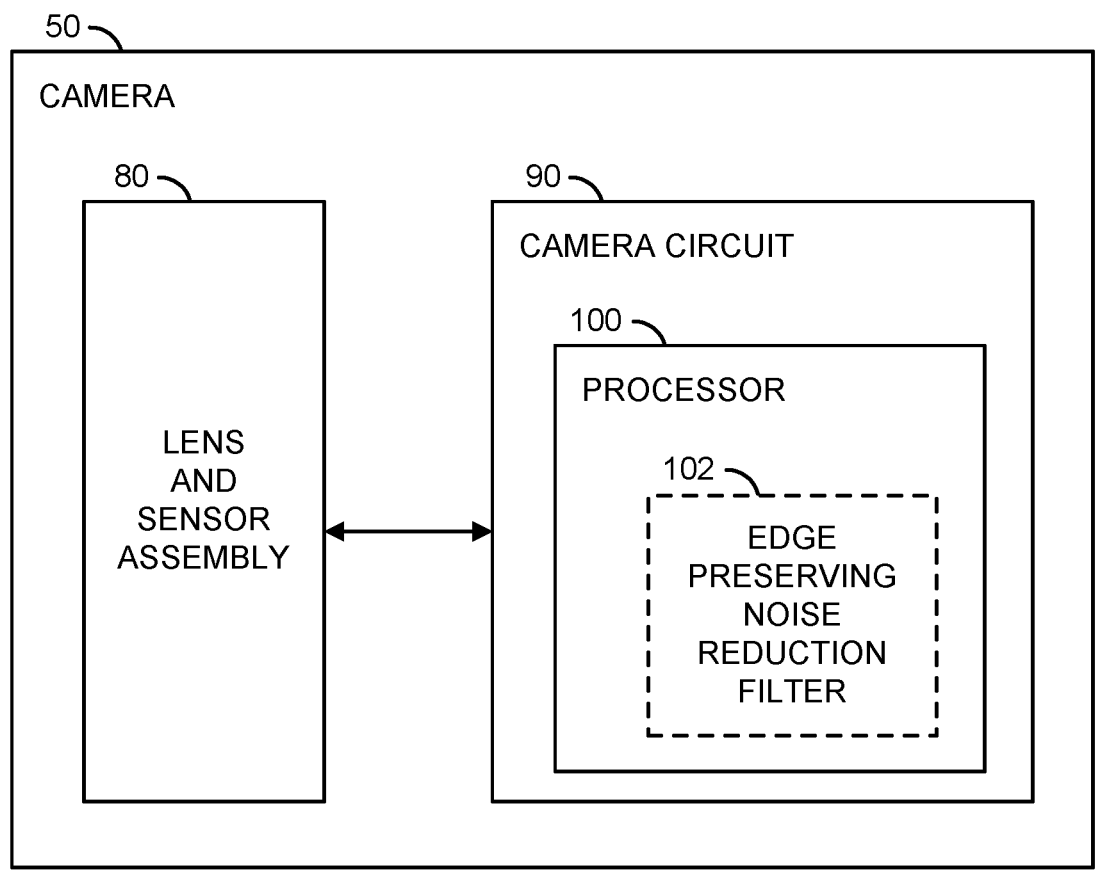
FIG. 1 is a block diagram illustrating an example implementation of edge preserving noise reduction filtering technique in accordance with an embodiment of the invention in the context of a camera.

Referring to FIG. 1, a block diagram illustrating an embodiment of the invention in the context of a camera 50 is shown. The camera 50 may comprise a block (or circuit) 80 and/or a block (or circuit) 90. The circuit 80 may be a lens and image sensor assembly. The circuit 90 may be a camera circuit. In some embodiments, the camera circuit 90 may comprise one or more circuits configured to implement a digital video camera, a digital still camera, or a hybrid digital video/still camera, collectively and individually referred to as digital cameras. In various embodiments, the camera circuit 90 may be used to capture and filter visible light images, thermal (or infrared radiation) images, and/or time-of-flight images. In an example, the electronics of the camera circuit 90 may be implemented as one or more integrated circuits. For example, an application specific integrated circuit (ASIC) or system-on-a-chip (SoC) may be used to implement a processing portion of the camera circuit 90. The camera 50 may comprise other components (not shown). The number, type and/or function of the components of the camera 50 may be varied according to the design criteria of a particular implementation.

The camera circuit 90 may comprise a block (or circuit) 100. The circuit 100 may implement a processor. The processor 100 may be implemented as an embedded processor (e.g., ARM, etc.). In some embodiments, the processor 100 may comprise a number of hardware blocks (or units) configured to perform an edge preserving noise reduction filtering scheme and control one or more image processing or computer vision operations (e.g., object detection, object recognition, etc.) performed on the noise filtered image. In some embodiments, the processor 100 may comprise a block (or circuit) 102. The circuit 102 may be implemented as embodying either software or firmware. The software or firmware 102 may comprise operations (or code or routines) implementing an edge preserving noise reduction filtering scheme in accordance with embodiments of the invention.

Each of the camera circuit 90, the processor 100, and/or the firmware 102 may comprise other components (not shown). The number, type and/or functions of the components of the camera circuit 90, the processor 100, and/or the firmware 102 may be varied according to the design criteria of a particular implementation.

Figure 2:
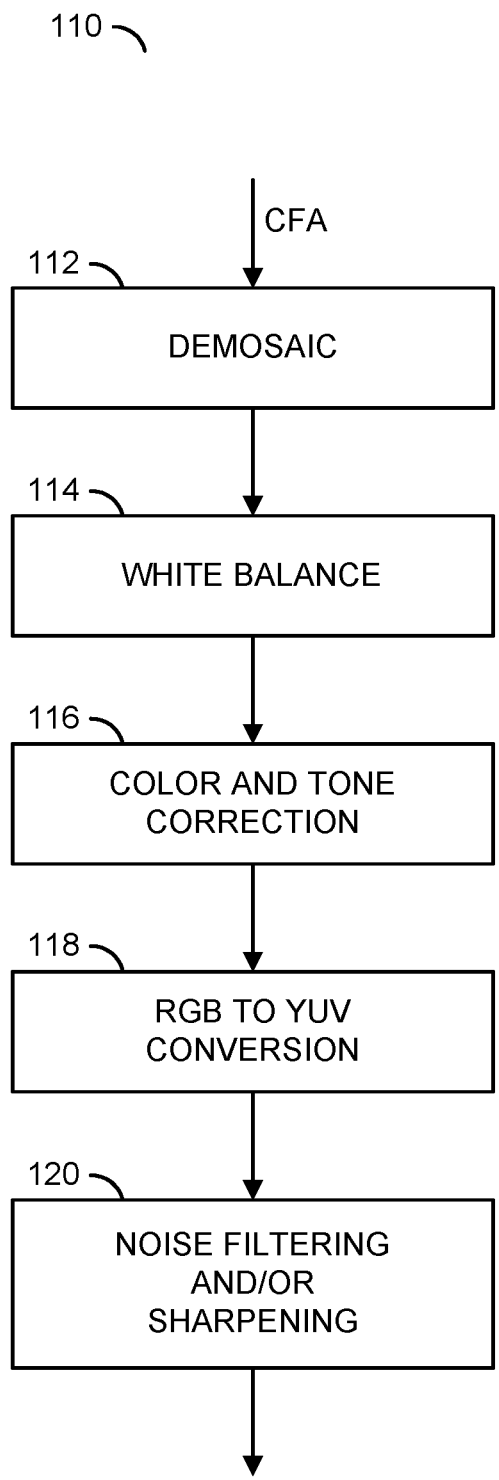
FIG. 2 is a diagram illustrating a number of steps in a digital signal processing pipeline in accordance with an embodiment of the invention.

Referring to FIG. 2, a diagram is shown illustrating a number of steps of an example pipeline of a digital signal processing (DSP) circuit of the processor 100 of FIG. 1. In various embodiments, the processor circuit 100 may implement a pipeline 110 for converting image data acquired from an image sensor (e.g., in a color filter array (CFA) picture format or RGB-IR picture format) to a YUV picture format. The pipeline 110 may implement a noise filtering algorithm in accordance with an embodiment of the invention that provides noise reduction while preserving object edges in an image. In various embodiments, the pipeline may comprise a step (or stage) 112, a step (stage) 114, a step (or stage) 116, a step (or stage) 118, and a step (or stage) 120. The step 112 may perform demosaicing on the CFA formatted image data to obtain linear RGB (red, green, blue) image data for each picture element (pixel). The step 114 may perform a white balancing operation. The step 116 may perform color and tone correction. The step 118 may perform RGB to YUV color space conversion. The step 120 may perform noise filtering (e.g., noise reduction, noise correction, etc.) and/or sharpening. The step 120 may implement the edge preserving noise reduction filtering technique in accordance with an embodiment of the invention. The steps 112-120 may use conventional techniques for demosiacing, white balance, color and tone correction, and color space conversion. Noise reduction and/or sharpening need not be limited to the step 120, but may be utilized at one or multiple points in the pipeline steps 112-118. In general, both visible light images and infrared radiation images may be processed using the pipeline 110. However, different configuration parameters may be selected depending upon whether the pipeline 110 is processing a visible light image or an infrared radiation image.

Noise characteristics vary based on the image data itself and also vary, or may be shaped, as the image data is processed through a DSP pipeline. Typically, the sensor picture has additive noise (e.g., noise magnitude is independent of the sensor data) and photon noise (e.g., noise due to the discrete nature of photons). The latter increases with brightness. For example, if ideally (e.g., averaged over taking the same picture many times), pixel A would measure 100 photons and pixel B would measure 1,000 photons, more variation (e.g., more noise) would be expected in the absolute number of photons for pixel B compared to pixel A. Hence, a sensor picture will typically have higher noise in brighter pixels.

White balance typically scales (e.g., applies gains to) each of the color channels (e.g., Red, Green and Blue values) by a different amount. The different scaling amounts also scale noise, so colors with higher white balance gains will typically be noisier. For example, if the Red, Green, and Blue gains are 1.5, 1, and 2, respectively, then after white balance Blue may be expected to be the noisiest and Green the cleanest.

Color and tone correction can also affect noise. A tone curve typically has a large slope for dark values and a small slope for bright values; this will increases noise in dark areas compared to bright areas. Because the pixels start out with lower noise in dark areas, typical behavior is that the darkest and brightest areas are lowest in noise and those areas in the middle (e.g., mid-tones) are noisiest. Moreover, color correction, which mixes input RGB, can make some colors noisier than others.

In various embodiments, a new noise filtering algorithm is proposed, which has lower computational complexity, fewer configuration parameters, and easier hardware acceleration deployment. In various embodiments, by running the new algorithm, image noise may be suppressed while object edges are generally maintained substantially unchanged.

Figure 3:
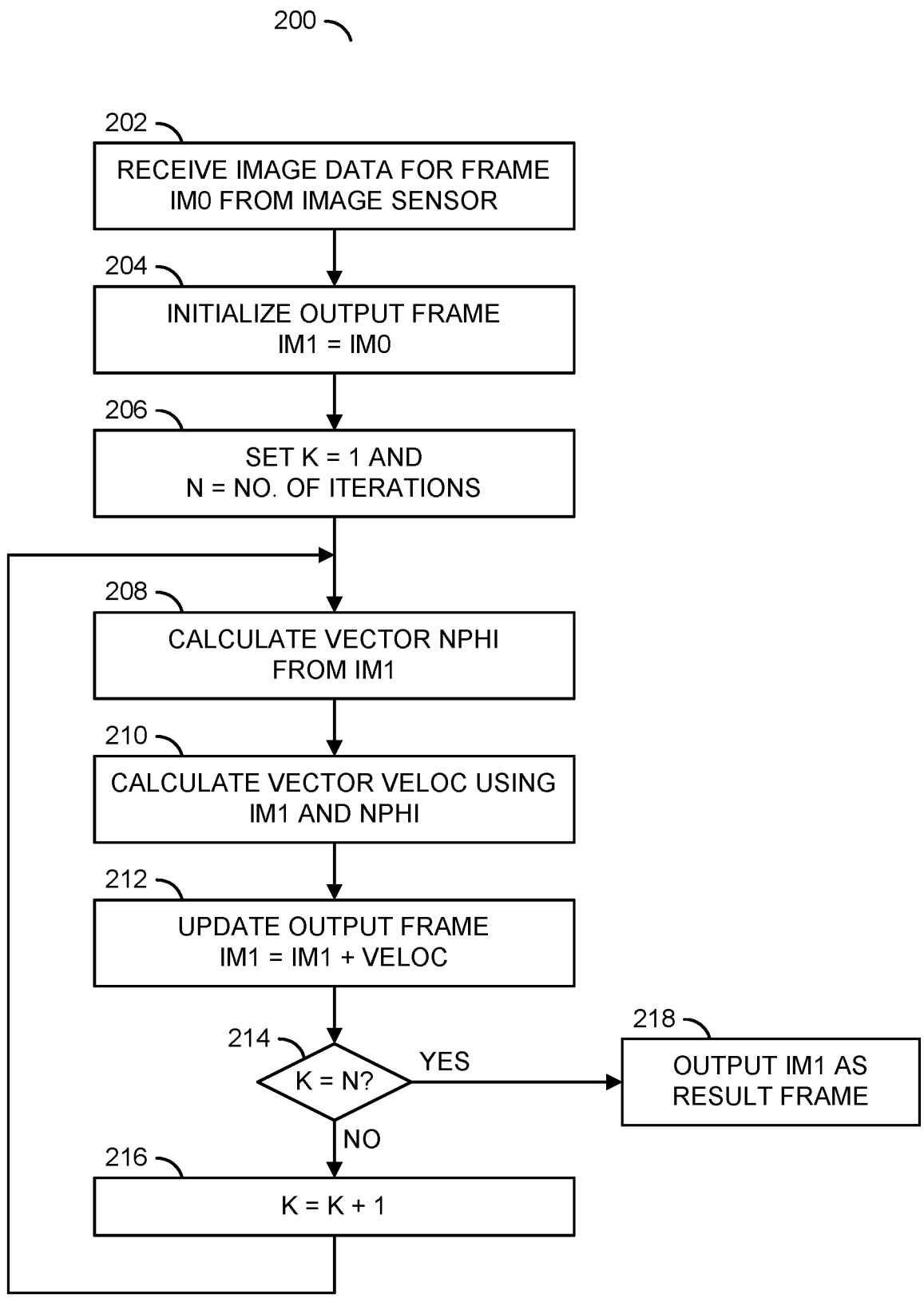
FIG. 3 is a flow diagram illustrating a process in accordance with an example embodiment of the invention.

Referring to FIG. 3, a flow diagram is shown illustrating an edge preserving noise reduction filtering process 200 in accordance with an example embodiment of the invention. In various embodiments, the process (or method) 200 may comprise a step (or state) 202, a step (or state) 204, a step (or state) 206, a step (or state) 208, a step (or state) 210, a step (or state) 212, a step (or state) 214, a step (or state) 216, and a step (or state) 218. In the step 202, image data for an input frame IM0 may be received from an image sensor. The image data may be stored in memory. In an example, the input frame IM0 may be stored as a two-dimensional (2D) array having a width Im_w and a height Im_h (e.g., IM0[1, Im_h, Im_w]). In an example, the image data of the input frame IM0 may be stored in system memory (e.g. dynamic random access memory (DRAM)).

In the step 204, the process 200 may initialize an output frame buffer IM1 in a local memory by copying the image data of the input frame IM0 from the DRAM to the local memory buffer for processing by the processor 100. Similar to the input frame, the output frame may be stored as a two-dimensional (2D) array having the width Im_w and the height Im_h (e.g., IM1[1, Im_h, Im_w]). In the step 206, the process 200 may initialize a first (index) variable (e.g., K) to an initial value (e.g., K=1) and initialize a second variable (e.g., N) with a number of iterations to be performed. The process 200 may then move to the step 208, which starts an iterative process comprising the steps 208-218.

In the step 208, the process 200 may calculate a number of image gradient related vectors (e.g., GY[1, Im_h, Im_w], GY[1, Im_h, Im_w], and GXY2[1, Im_h, Im_w]) and a four-channel vector (e.g., NPHI[4, Im_h, Im_w]) using the image data of the output frame IM1. The four-channel vector NPHI[4, Im_h, Im_w] generally comprises values for each pixel location of the input image. In calculating the values of the four-channel vector NPHI[4, Im_h, Im_w], the process 200 first calculates the vector GX[1, Im_h, Im_w] representing a horizontal gradient of the image IM1 at each pixel location and the vector GY[1, Im_h, Im_w] representing a vertical gradient of the image IM1 at each pixel location. Once the horizontal and vertical gradient vectors are calculated, the process 200 may generate the vector GXY2[1, Im_h, Im_w] representing a sum of the squares of the gradient magnitudes at each pixel location. In an example, the vector GXY2[1, Im_h, Im_w] may be calculated using the following Equation 1:

$$GXY2 = GX*GX + GY*GY, \qquad \text{EQ. 1}$$

where GX is the horizontal gradient vector and GY is the vertical gradient vector.

When the vector GXY2[1, Im_h, Im_w] has been calculated for each pixel location, the process 200 may calculate a vector SPHI[1, Im_h, Im_w] representing an inverse exponential function of the sum of the squares of the gradients at each pixel location of the image IM1. In an example, the vector SPHI[1, Im_h, Im_w] may be calculated using the following Equation 2:

$$SPHI[1, Im\_h, Im\_w] = 1/(\exp(GXY2/\text{Alpha}) + \text{Beta}), \qquad \text{EQ. 2}$$

where Alpha and Beta are values selected to avoid a calculation overflow. In an example, Alpha may have a value greater than 5 and Beta may have a value of Alpha-1.

Once the vector SPHI[1, Im_h, Im_w] has been calculated at each pixel location of the image IM1, the process 200 may calculate the values of the four-channel vector NPHI[4, Im_h, Im_w] representing the inverse exponential function of the sum of the squares of the gradients at each half-pixel location of the image IM1. In an example, the four-channel vector NPHI[4, Im_h, Im_w] may be calculated using the following process:

For each i from 1 to Im_h:
    For each j from 1 to Im_w:

$$NPHI[0,i,j] = (SPHI[i,j-1] + SPHI[i,j])/2;$$

$$NPHI[1,i,j] = (SPHI[i,j+1] + SPHI[i,j])/2;$$

$$NPHI[2,i,j] = (SPHI[i-1,j] + SPHI[i,j])/2;$$

$$NPHI[3,i,j] = (SPHI[i+1,j] + SPHI[i,j])/2;$$

Next j
Next i.

Once the values of the vector NPHI[4, Im_h, Im_w] have been calculated for each pixel location, the process 200 may then move to the step 210.

In the step 210, the process 200 may calculate a vector value VELOC[1, Im_h, Im_w]) for each pixel location of the input image using the image data of the output frame IM1 and the values of the vector NPHI[4, Im_h, Im_w]. In calculating the vector values VELOC[1, Im_h, Im_w], the process 200 may first calculate a vector SUM_NPHI[1, Im_h, Im_w] representing a sum of the values of the vector NPHI along the channel dimension. In an example, the values of the vector SUM_NPHI[1, Im_h, Im_w] may be calculated at each location of the image IM1 using the following Equation 3:

$$SUM\_NPHI = NPHI[0,:,:] + NPHI[1,:,:] + NPHI[2,:,:] + NPHI[3,:,:]. \qquad \text{EQ. 3}$$

When the vector SUM_NPHI[1, Im_h, Im_w] has been calculated for each pixel location, the process 200 may generate the vector values VELOC[1, Im_h, Im_w] using the following process:
    For each i from 1 to Im_h:
        For each j from 1 to Im_w:

A=IM 1[i−1,j]*NPHI[0,i−1,j]+IM 1[i+1,j]*NPHI[1,i+1,j]+IM 1[i,j−1]*NPHI[2,i,j−1]+IM 1[i,j+1]*NPHI[3,i,j+1];

B=IM 1[i,j]*SUM_NPHI[i,j];

VELOC[i,j]=A-B;

Next j;
    Next i.

Once the vector values VELOC[1, Im_h, Im_w] have been calculated for each pixel location, the process 200 may then move to the step 212.

In the step 212, the process 200 may transform the image data in the output frame buffer IM1 to reduce noise while maintaining object edges. In an example, the process 200 generally adds the calculated vector value VELOC[1, Im_h, Im_w] to the image data IM1[Im_h, Im_w] at each location (e.g., IM1=IM1+VELOC). The process 200 may then move to the state 214. In the step 214, the process 200 checks whether the predetermined number of iterations has been performed (e.g., K=N?). When the predetermined number of iterations has not been performed (e.g., K<N), the process 200 moves to the step 216 to increment the index K by 1 and then returns to the step 208 to perform another iteration. When the predetermined number of iterations has been performed (e.g., K=N), the process 200 moves to the step 218 where the transformed image data in the output frame buffer IM1 may be output as the result frame. In an example, the image data in the output frame buffer IM1 may be copied back to the system memory (e.g., DRAM).

Figure 4:
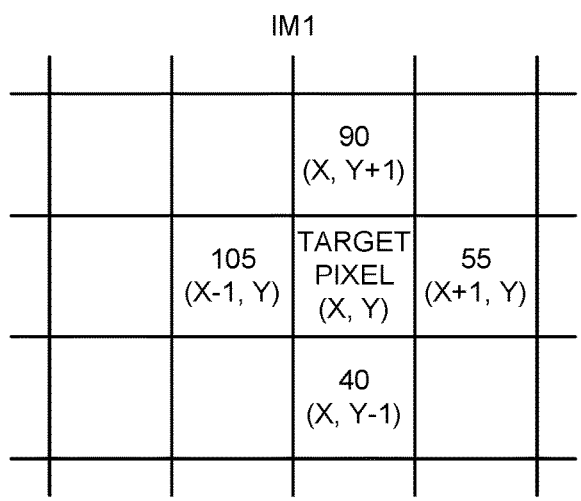
FIG. 4 is a diagram illustrating a number of arrays used for calculating gradient-related values for an image.
Figure 4:
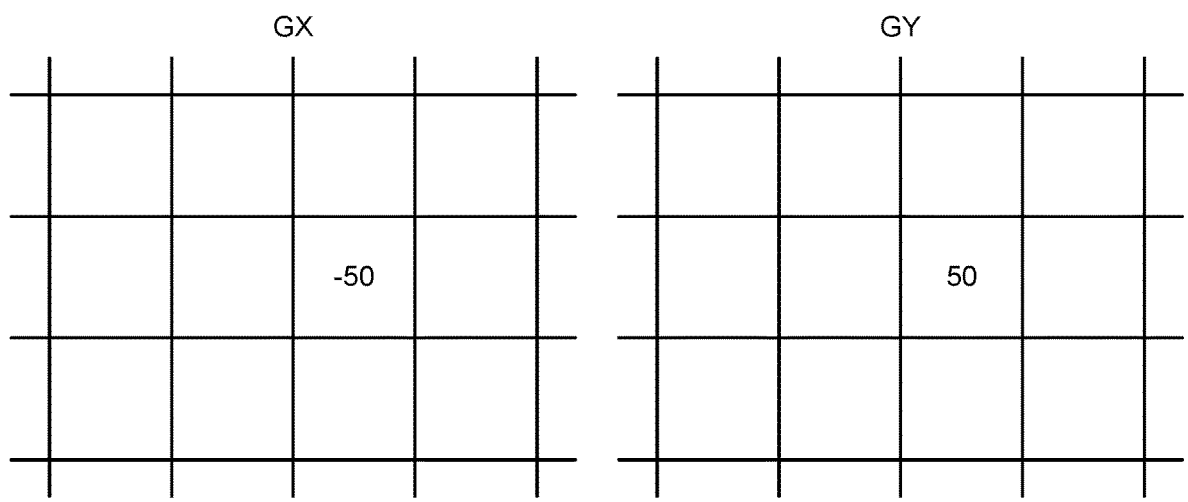
Figure 4:
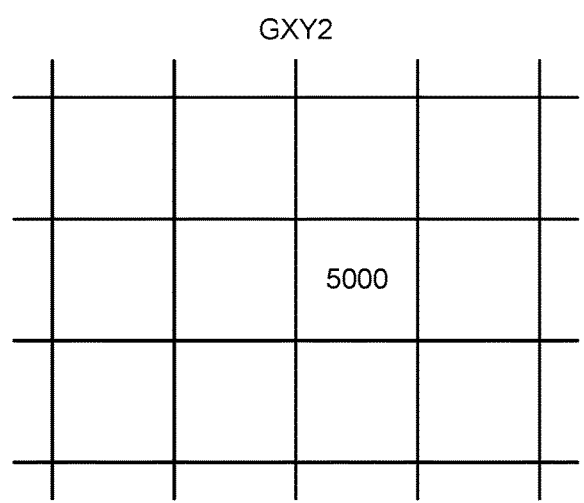

Referring to FIG. 4, a diagram is shown illustrating a number of memory buffers holding arrays used for calculating gradient-related values for an image. In an example, a first memory buffer may be set up to hold the image data of the output frame IM1 Similar to the input frame, the output frame IM1 may be stored as a two-dimensional (2D) array having the width Im_w and the height Im_h (e.g., IM1[1, Im_h, Im_w]. In general, the intensity of the image pixels of the output frame IM1 may be expressed as a function of the pixel coordinates (e.g., Intensity=f(x,y)). In an image, intensity of a pixel may be defined as the value of the pixel. For example, in an 8 bit grayscale image, there are 256 gray levels. Thus, each pixel of the image stored in the output buffer IM1 may have a value from 0 to 255, which will be the intensity of the pixel.

Each pixel of the output frame buffer IM1 has a corresponding horizontal gradient GX and vertical gradient GY. A second memory buffer may be set up to hold the horizontal gradient values for the output frame IM1 and a third memory buffer may be set up to hold vertical gradient values for the output frame IM1. Similar to the output frame, the horizontal gradient GX and the vertical gradient GY may be stored as two-dimensional (2D) arrays having the width Im_w and the height Im_h (e.g., GX[1, Im_h, Im_w] and GY[1, Im_h, Im_w], respectively). In an example, the gradients GX and GY may be expressed by the following Equation 4:

$$\nabla f(x,y) = \begin{bmatrix} GX \\ GY \end{bmatrix} = \begin{bmatrix} \frac{\partial f}{\partial x} \\ \frac{\partial f}{\partial y} \end{bmatrix} = \begin{bmatrix} f(x+1,y) - f(x-1,y) \\ f(x,y+1) - f(x,y-1) \end{bmatrix}. \quad \text{EQ. 4}$$

Applying Equation 4 to a target pixel at location x,y in the array IM1 illustrated in FIG. 4, yields the following values for the gradients GX[1,x,y] and GY[1,x,y]:

$$\nabla f(x,y) = \begin{bmatrix} f(x+1,y) - f(x-1,y) \\ f(x,y+1) - f(x,y-1) \end{bmatrix} = \begin{bmatrix} 55 - 105 \\ 90 - 40 \end{bmatrix} = \begin{bmatrix} -50 \\ 50 \end{bmatrix}, \quad \text{EQ. 5}$$

which are also illustrated in FIG. 4.

Once the horizontal and vertical gradient vectors GX[1, Im_h, Im_w] and GY[1, Im_h, Im_w] have been calculated, the vector GXY2[1, Im_h, Im_w] representing the sum of the squares of the gradient magnitudes at each pixel location may be calculated. In an example, a fourth memory buffer GXY2 may be set up to hold the sum of the squares of the gradient magnitude values for the output frame IM1. In another example, the vector GXY2[1, Im_h, Im_w] may share one of the memory buffers used to hold the gradient vectors GX[1, Im_h, Im_w] and GY[1, Im_h, Im_w], because the GX and GY generally become obsolete after the values of the vector GXY2[1, Im_h, Im_w] are calculated. In an example, the vector GXY2[1, Im_h, Im_w] may be calculated using Equation 1 above:

$$GXY2 = GX*GX + GY*GY, \quad \text{EQ. 1}$$

where GX is the horizontal gradient vector and GY is the vertical gradient vector. Applying Equation 1 to a target pixel locations in the gradient vectors GX[1, Im_h, Im_w] and GY[1, Im_h, Im_w] illustrated in FIG. 4, yields the following value for the corresponding location in the vector GXY2[1, Im_h, Im_w]:

$$GXY2(x,y) = (-50)*(-50) + 50*50 = 5000.$$

Figure 5:
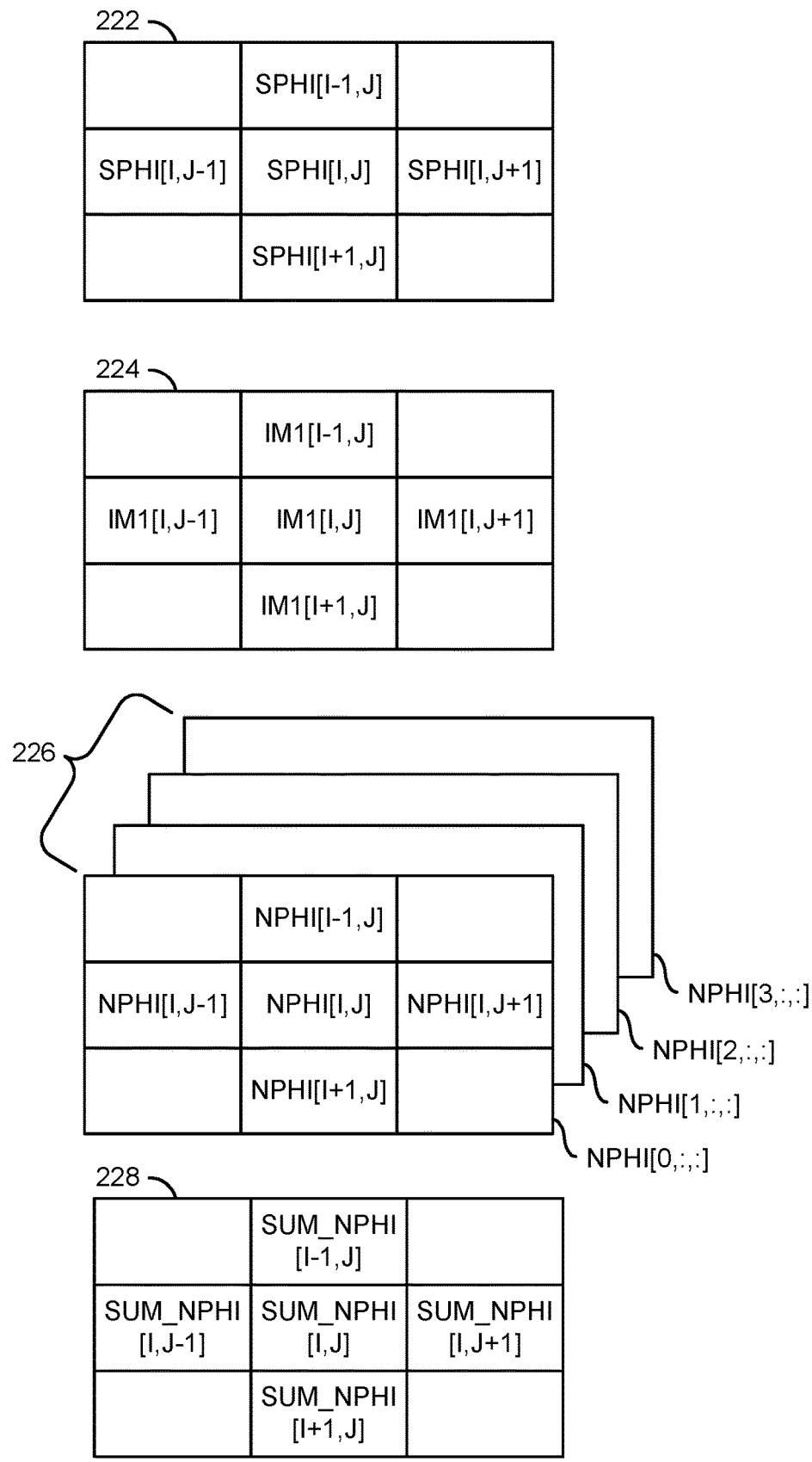
FIG. 5 is a diagram illustrating a number of arrays used for calculating an inverse exponential gradient magnitude used to apply edge preserving noise reduction filtering to an image.

Referring to FIG. 5, a diagram is shown illustrating a number of arrays used for calculating an inverse exponential gradient magnitude used in applying an edge preserving noise reduction filtering technique in accordance with an embodiment of the invention to the image data in the output frame buffer IM1. In an example, four memory buffers 222, 224, 226, and 228 may be used to perform the inverse exponential gradient optimization in accordance with example embodiments of the invention. The memory buffer 222 may be configured to hold all or part of the vector SPHI[1, Im_h, Im_w]. The memory buffer 224 may be configured to hold all or part of the image data in the output frame buffer IM1. The memory buffer 226 may be configured to hold all or part of the vector NPHI[4, Im_h, Im_w]. The memory buffer 228 may be configured to hold all or part of the vector SUM_NPHI[1, Im_h, Im_w]. In an example, the output frame buffer IM1 may be used instead of a separate buffer 224.

When the vector GXY2[1, Im_h, Im_w] has been calculated for each pixel location, the values of the vector SPHI[1, Im_h, Im_w] representing an inverse exponential function of the sum of the squares of the gradients at each pixel location of the image IM1 may be calculated and stored in the buffer 222. In an example, the vector SPHI[1, Im_h, Im_w] may be calculated using the following Equation 2:

$$SPHI[1, Im\_h, Im\_w] = 1/(\exp(GXY2/Alpha) + Beta), \quad \text{EQ. 2}$$

where Alpha and Beta are values selected to avoid a calculation overflow. In an example, Alpha may have a value greater than 5 and Beta may have a value of Alpha-1. In an example, the memory buffer 222 may share the memory buffer used to hold the vector GXY2[1, Im_h, Im_w].

Once the vector SPHI[1, Im_h, Im_w] has been calculated at each pixel location of the image IM1, the values of the four-channel vector NPHI[4, Im_h, Im_w] representing the inverse exponential function of the sum of the squares of the gradients at each half-pixel location of the image IM1 may be calculated and stored in the memory buffer 226. In an example, the four-channel vector NPHI[4, Im_h, Im_w] may be calculated using the following process:

For each i from 1 to Im_h:
For each j from 1 to Im_w:

$$NPHI[0,i,j]=(SPHI[i,j-1]+SPHI[i,j])/2;$$

$$NPHI[1,i,j]=(SPHI[i,j+1]+SPHI[i,j])/2;$$

$$NPHI[2,i,j]=(SPHI[i-1,j]+SPHI[i,j])/2;$$

$$NPHI[3,i,j]=(SPHI[i+1,j]+SPHI[i,j])/2;$$

Next j
Next i.

Once the values of the vector NPHI[4, Im_h, Im_w] have been calculated for each pixel location, the values for the vector SUM_NPHI[1, Im_h, Im_w] may be calculated and stored in the memory buffer 228. In an example, the values for the vector SUM_NPHI[1, Im_h, Im_w] may be calculated at each location of the image IM1 using the following Equation 3:

$$SUM\_NPHI=NPHI[0,:,:]+NPHI[1,:,:]+NPHI[2,:,:]+NPHI[3,:,:]. \quad EQ.\ 3$$

When the values of the vector SUM_NPHI[1, Im_h, Im_w] have been calculated for each pixel location, the values of the vector VELOC[1, Im_h, Im_w] may be calculated using the image data of the output frame IM1, the values of the vector NPHI[4, Im_h, Im_w], and the values of the vector SUM_NPHI[1, Im_h, Im_w]. In an example, the vector values VELOC[1, Im_h, Im_w]] may be calculated using the following process:

For each i from 1 to Im_h:
For each j from 1 to Im_w:

$$A=IM\ 1[i-1,j]*NPHI[0,i-1,j]+IM\ 1[i+1,j]*NPHI[1,i+1,j]+IM\ 1[i,j-1]*NPHI[2,i,j-1]+IM\ 1[i,j+1]*NPHI[3,i,j+1];$$

$$B=IM\ 1[i,j]*SUM\_NPHI[i,j];$$

$$VELOC[i,j]=A-B;$$

Next j;
Next i.

Once the values of the vector VELOC[1, Im_h, Im_w] have been calculated for each pixel location, the image data in the output frame buffer IM1 may be transformed to reduce noise while maintaining object edges. In an example, the calculated vector value VELOC[1, Im_h, Im_w] may be added to the image data IM1[Im_h, Im_w] at each location (e.g., IM1=IM1+VELOC) in the output frame buffer IM1. Once the image data in the output frame buffer IM1 has been transformed by the predetermined number of iterations, the modified image data may be stored back to the system memory (e.g., DRAM) for storage and/or subsequent computer vision processing (e.g., object detection, object identification, object tracking, time-of-flight determination, etc.).

Figure 6:
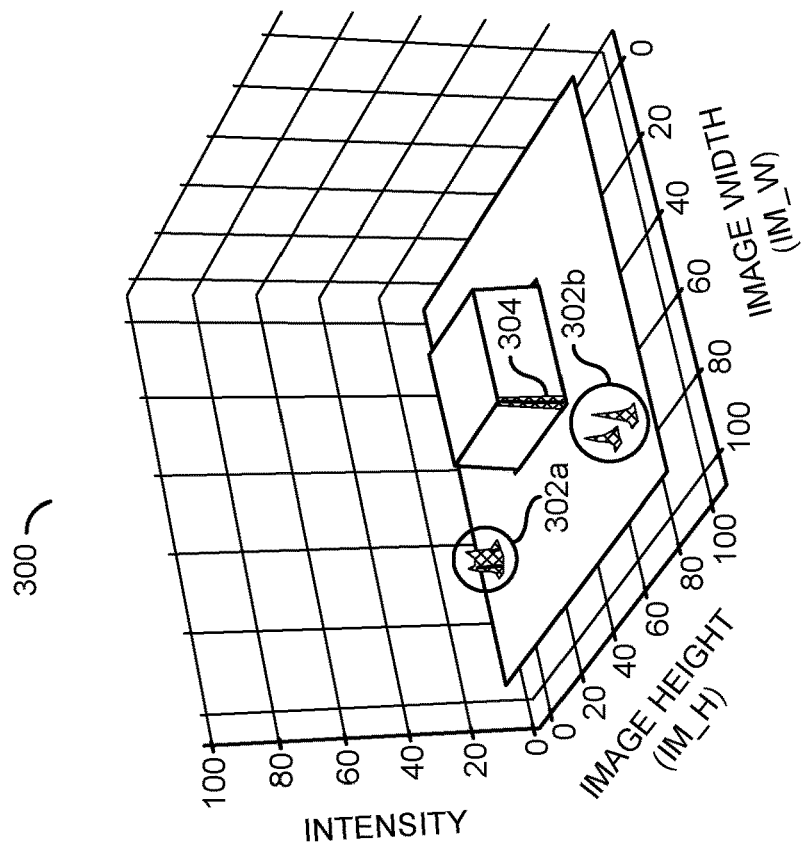

Referring to FIG. 6, a diagram of a graph 300 is shown illustrating simulation of a source image with noise. The graph 300 generally illustrates an original image with noises 302a and 302b, and a true object 304. Normally, the noises 302a and 302b may appear as sharpening intensity speckles.

Figure 7:
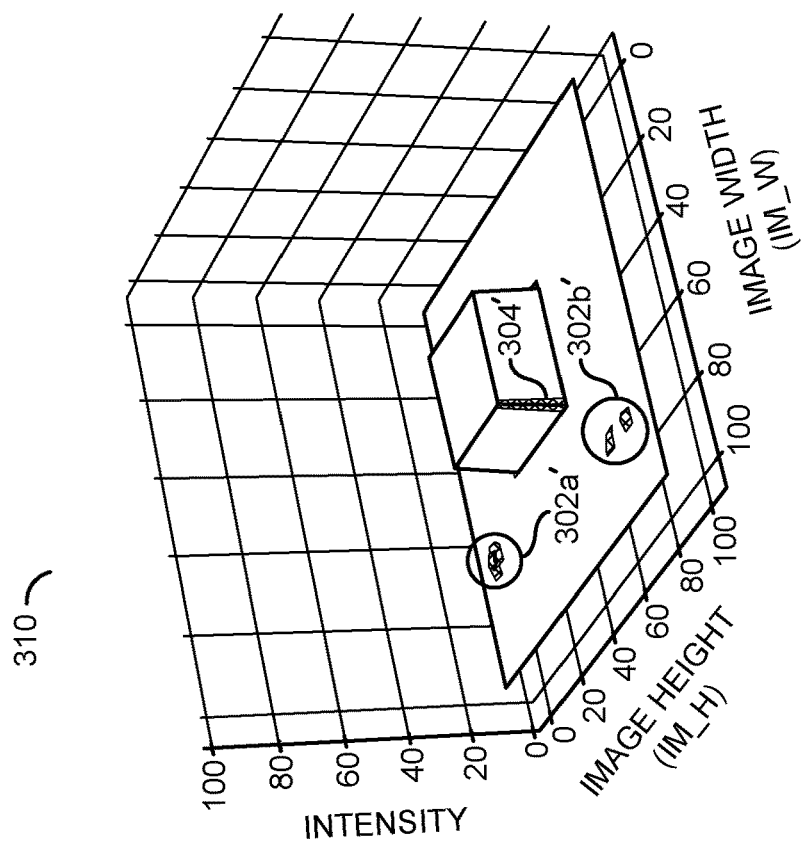
FIGS. 6 and 7 are diagrams illustration simulation of edge preserving noise reduction filtering in accordance with an embodiment of the invention.

Referring to FIG. 7, a diagram of a graph 310 is shown illustrating simulation of the image data of FIG. 6 after application of eight iterations of an edge preserving noise reduction filtering technique in accordance with an example embodiment of the invention. Following application of the edge preserving noise reduction filtering technique in accordance with an example embodiment of the invention, the noise elements 302a and 302b are significantly reduced (as illustrated by elements 302a' and 302b') while the object edge 304 is substantially unchanged (as illustrated by edge 304').

Figure 8:
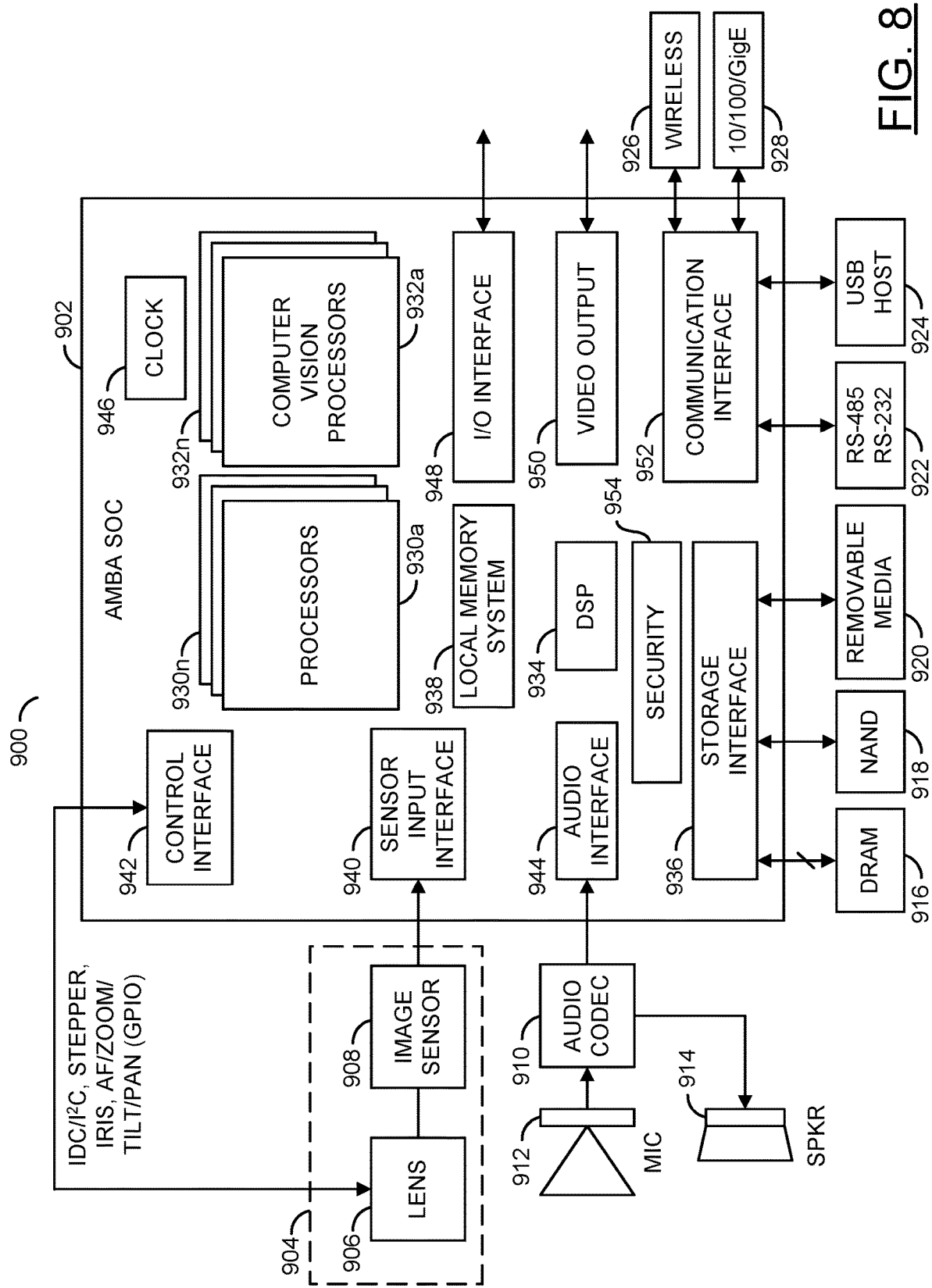
FIG. 8 is a diagram of a camera system illustrating an example implementation of a computer vision system in which an edge preserving noise reduction filtering technique in accordance with example embodiments of the invention may be implemented.

Referring to FIG. 8, a diagram of a camera system 900 is shown illustrating an example implementation of a computer vision system in which an edge preserving noise reduction filtering algorithm in accordance with example embodiments of the invention may be implemented. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the circuits and processes described above in connection with FIG. 1 through FIG. 7.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be implemented as one or more image sensors. In one example, the circuit 908 may be implemented as a single sensor. In another example, the circuit 908 may be implemented as a stereo pair of sensors. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera system 900. The lens assembly 906 may capture and/or focus light for the image sensor(s) 908. The lens assembly 906 may implement an optical lens or lenses. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera system 900.

The image sensor(s) 908 may receive light from the lens assembly 906. The image sensor(s) 908 may be configured to transform the received focused light into digital data (e.g., bitstreams). In some embodiments, the image sensor(s) 908 may perform an analog to digital conversion. For example, the image sensor(s) 908 may perform a photoelectric conversion of the focused light received from the lens assembly

906. The image sensor(s) 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930a-930n, a number of blocks (or circuits) 932a-932n, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, a block (or circuit) 952, and/or a block (or circuit) 954. The number of circuits 930a-930n may be processor circuits. In various embodiments, the circuits 930a-930n may include one or more embedded processors (e.g., ARM, etc.). The circuits 932a-932n may implement a number of computer vision related processor circuits. In an example, one or more of the circuits 932a-932n may implement various computer vision related applications. The circuit 934 may be a digital signal processing (DSP) module. In some embodiments, the circuit 934 may implement separate image DSP and video DSP modules.

The circuit 936 may be a storage interface. The circuit 936 may interface the processor/camera circuit 902 with the DRAM 916, the non-volatile memory 918, and the removable media 920. One or more of the DRAM 916, the non-volatile memory 918 and/or the removable media 920 may store computer readable instructions. The computer readable instructions may be read and executed by the processors 930a-930n. In response to the computer readable instructions, the processors 930a-930n may be operational to operate as controllers for the processors 932a-932n. For example, the resources of the processors 932a-932n may be configured to efficiently perform various specific operations in hardware and the processors 930a-930n may be configured to make decisions about how to handle input/output to/from the various resources of the processors 932.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. In an example, the DAG memory 168 may be implemented in the local memory system 938. The circuit 940 may implement a sensor input (or interface). The circuit 942 may implement one or more control interfaces including but not limited to an inter device communication (IDC) interface, an inter integrated circuit (I2C) interface, a serial peripheral interface (SPI), and a pulse width modulation (PWM) interface. The circuit 944 may implement an audio interface (e.g., an I2S interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuit 954 may be a security module.

The circuits 930 through 954 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the processors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound (I2S) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®, Z-Wave, LoRa, Institute of Electrical and Electronics Engineering (IEEE) 802.11a/b/g/n/ac (WiFi), IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, 5G, LTE M, NB-IoT, SMS, etc. The communication module 952 may also include support for communication using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The security module 954 may include a suite of advanced security features to implement advanced on-device physical security, including OTP, secure boot, TrustZone, and I/O visualization, and DRAM scrambling. In an example, the security module 958 may include a true random number generator. In an example, the security module 954 may be used for DRAM communication encryption on the processor/camera circuit 902.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, Z-Wave, LoRa, Wi-Fi IEEE 802.11a/b/g/n/ac, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, 5G, SMS, LTE M, NB-IoT, etc. The processor/camera circuit 902 may also include support for communication using one or more of the universal serial bus protocols (e.g., USB 1.0, 2.0, 3.0, etc.).

Figure 9:
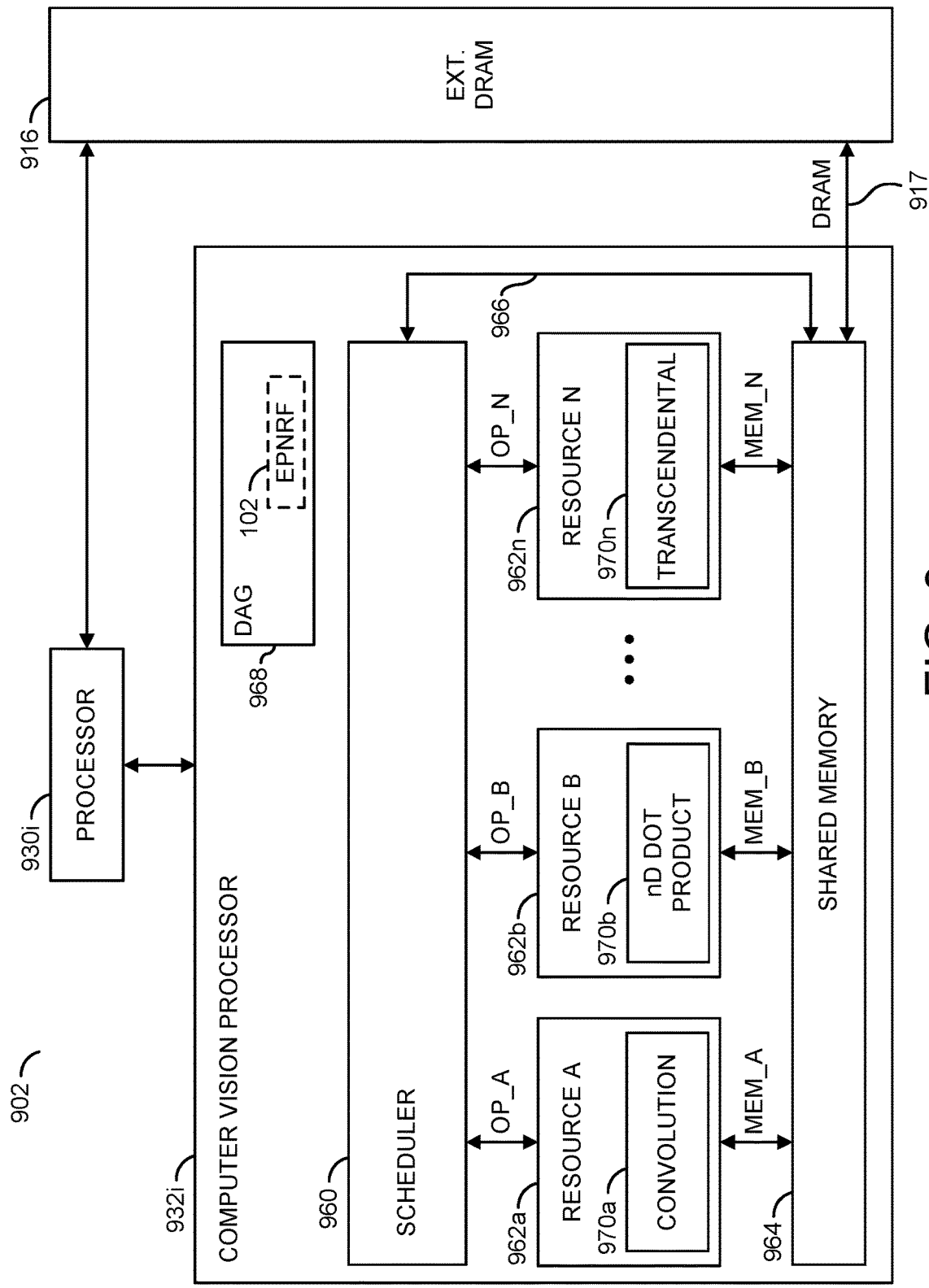
FIG. 9 is a diagram illustrating a context in which an edge preserving noise reduction filtering technique in accordance with an example embodiment of the invention may be implemented.

Referring to FIG. 9, a diagram of a processing circuit 902 is shown illustrating a context in which an edge preserving noise reduction filtering algorithm in accordance with an example embodiment of the invention may be implemented. In various embodiments, the processing circuit 902 may be implemented as part of a computer vision system. In various embodiments, the processing circuit 902 may be implemented as part of a camera, a computer, a server (e.g., a cloud server), a smart phone (e.g., a cellular telephone), a personal digital assistant, or the like. In an example, the processing circuit 902 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuit 902 generally comprises hardware circuitry that is optimized to provide a high performance image processing and computer vision pipeline in minimal area and with minimal power consumption. In an example, various operations used to perform image processing, feature detection/extraction, and/or object detection/classification for computer (or machine) vision may be implemented using hardware modules designed to reduce computational complexity and use resources efficiently.

In an example embodiment, the processing circuit 902 may comprise a block (or circuit) 930*i*, a block (or circuit) 932*i*, a block (or circuit) 916, and/or a memory bus 917. The circuit 930*i* may implement a first processor. The circuit 932*i* may implement a second processor. In an example, the circuit 932*i* may implement a computer vision processor. In an example, the processor 932*i* may be an intelligent vision processor. The circuit 916 may implement an external memory (e.g., a memory external to the circuits 930*i* and 932*i*). In an example, the circuit 916 may be implemented as a dynamic random access memory (DRAM) circuit. The processing circuit 902 may comprise other components (not shown). The number, type and/or arrangement of the components of the processing circuit 902 may be varied according to the design criteria of a particular implementation.

The circuit 930*i* may implement a processor circuit. In some embodiments, the processor circuit 930*i* may be implemented using a general purpose processor circuit. The processor 930*i* may be operational to interact with the circuit 932*i* and the circuit 916 to perform various processing tasks.

In an example, the processor 930*i* may be configured as a controller for the circuit 932*i*. The processor 930*i* may be configured to execute computer readable instructions. In one example, the computer readable instructions may be stored by the circuit 916. In some embodiments, the computer readable instructions may comprise controller operations. The processor 930*i* may be configured to communicate with the circuit 932*i* and/or access results generated by components of the circuit 932*i*. In an example, the processor 930*i* may be configured to utilize the circuit 932*i* to perform operations associated with one or more neural network models.

In an example, the processor 930*i* may be configured to program the circuit 932*i* with the edge preserving noise reduction filtering (EPNRF) technique 102. In various embodiments, the EPNRF technique 102 may be configured for operation in an edge device. In an example, the processing circuit 902 may be coupled to a sensor (e.g., video camera, etc.) configured to generate a data input. The processing circuit 902 may be configured to generate one or more outputs in response to the data input from the sensor. The data input may be processed by the EPNRF technique 102. The operations performed by the processor 930*i* may be varied according to the design criteria of a particular implementation.

In various embodiments, the circuit 916 may implement a dynamic random access memory (DRAM) circuit. The circuit 916 is generally operational to store multidimensional arrays of input data elements and various forms of output data elements. The circuit 916 may exchange the input data elements and the output data elements with the processor 930*i* and the processor 932*i*.

The processor 932*i* may implement a computer vision processor circuit. In an example, the processor 932*i* may be configured to implement various functionality used for computer vision. The processor 932*i* is generally operational to perform specific processing tasks as arranged by the processor 930*i*. In various embodiments, all or portions of the processor 932*i* may be implemented solely in hardware. The processor 932*i* may directly execute a data flow directed to edge preserving noise reduction filtering, and generated by software (e.g., a directed acyclic graph, etc.) that specifies processing (e.g., computer vision) tasks. In some embodiments, the processor 932*i* may be a representative example of numerous computer vision processors implemented by the processing circuit 902 and configured to operate together.

In an example embodiment, the processor 932*i* generally comprises a block (or circuit) 960, one or more blocks (or circuits) 962*a*-962*n*, a block (or circuit) 960, a path 966, and a block (or circuit) 968. The block 960 may implement a scheduler circuit. The blocks 962*a*-962*n* may implement hardware resources (or engines). The block 964 may implement a shared memory circuit. The block 968 may implement a directed acyclic graph (DAG) memory. In an example embodiment, one or more of the circuits 962*a*-962*n* may comprise blocks (or circuits) 970*a*-970*n*. In the example shown, circuits 970*a*, 970*b*, and 970*n* are implemented.

In an example embodiment, the circuit 970*a* may implement convolution operations, the circuit 970*b* may be configured to provide n-dimensional (nD) dot product operations, and the circuit 970*n* may be configured to perform transcendental operations. The circuits 970*a*-970*n* may be utilized to provide edge preserving noise reduction filtering in accordance with an example embodiment of the invention. The convolution, nD dot product, and transcendental operations may be used to perform computer (or machine) vision tasks (e.g., as part of an object detection process, etc.). In yet another example, one or more of the circuits 962*c*-962*n* may comprise blocks (or circuits) 970*c*-970*n* (not shown) to provide convolution calculations in multiple dimensions.

In an example, the circuit 932*i* may be configured to receive directed acyclic graphs (DAGs) from the processor 930*i*. The DAGs received from the processor 930*i* may be stored in the DAG memory 968. The circuit 932*i* may be configured to execute a DAG for the edge preserving noise reduction filtering scheme 102 using the circuits 960, 962*a*-962*n*, and 964.

Multiple signals (e.g., OP_A to OP_N) may be exchanged between the circuit 960 and the respective circuits 962*a*-962*n*. Each signal OP_A to OP_N may convey execution operation information and/or yield operation information. Multiple signals (e.g., MEM A to MEM N) may be exchanged between the respective circuits 962*a*-962*n* and the circuit 964. The signals MEM A to MEM N may carry data. A signal (e.g., DRAM) may be exchanged between the circuit 916 and the circuit 964. The signal DRAM may transfer data between the circuits 916 and 960 (e.g., on the memory bus 966).

The circuit 960 may implement a scheduler circuit. The scheduler circuit 960 is generally operational to schedule tasks among the circuits 962*a*-962*n* to perform a variety of computer vision related tasks as defined by the processor 930*i*. Individual tasks may be allocated by the scheduler circuit 960 to the circuits 962*a*-962*n*. The scheduler circuit 960 may allocate the individual tasks in response to parsing the directed acyclic graphs (DAGs) provided by the processor 930*i*. The scheduler circuit 960 may time multiplex the tasks to the circuits 962*a*-962*n* based on the availability of the circuits 962*a*-962*n* to perform the work.

Each circuit 962*a*-962*n* may implement a processing resource (or hardware engine). The hardware engines 962*a*-962*n* are generally operational to perform specific processing tasks. The hardware engines 962*a*-962*n* may be implemented to include dedicated hardware circuits that are optimized for high-performance and low power consumption while performing the specific processing tasks. In some configurations, the hardware engines 962*a*-962*n* may operate in parallel and independent of each other. In other configurations, the hardware engines 962*a*-962*n* may operate collectively among each other to perform allocated tasks.

The hardware engines 962*a*-962*n* may be homogenous processing resources (e.g., all circuits 962*a*-962*n* may have the same capabilities) or heterogeneous processing resources (e.g., two or more circuits 962*a*-962*n* may have different capabilities). The hardware engines 962*a*-962*n* are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator, and a power of two downsample operator, etc.

In various embodiments, the hardware engines 962*a*-962*n* may be implemented solely as hardware circuits. In some embodiments, the hardware engines 962*a*-962*n* may be implemented as generic engines that may be configured through circuit customization and/or software/firmware to operate as special purpose machines (or engines). In some embodiments, the hardware engines 962a-962n may instead be implemented as one or more instances or threads of program code executed on the processor 930i and/or one or more processors 932i, including, but not limited to, a vector processor, a central processing unit (CPU), a digital signal processor (DSP), or a graphics processing unit (GPU). In some embodiments, one or more of the hardware engines 962a-962n may be selected for a particular process and/or thread by the scheduler 960. The scheduler 960 may be configured to assign the hardware engines 962a-962n to particular tasks in response to parsing the directed acyclic graphs stored in the DAG memory 968.

The circuit 964 may implement a shared memory circuit. The shared memory 964 may be configured to store data in response to input requests and/or present data in response to output requests (e.g., requests from the processor 930i, the DRAM 916, the scheduler circuit 960 and/or the hardware engines 962a-962n). In an example, the shared memory circuit 964 may implement an on-chip memory for the computer vision processor 932i. The shared memory 964 is generally operational to store all of or portions of the multidimensional arrays (or vectors) of input data elements and output data elements generated and/or utilized by the hardware engines 962a-962n. The input data elements may be transferred to the shared memory 964 from the DRAM circuit 916 via the memory bus 917. The output data elements may be sent from the shared memory 964 to the DRAM circuit 916 via the memory bus 917.

The path 966 may implement a transfer path internal to the processor 932i. The transfer path 966 is generally operational to move data from the scheduler circuit 960 to the shared memory 964. The transfer path 966 may also be operational to move data from the shared memory 964 to the scheduler circuit 960.

The processor 930i is shown communicating with the computer vision processor 932i. The processor 930i may be configured as a controller for the computer vision processor 932i. In some embodiments, the processor 930i may be configured to transfer instructions to the scheduler 960. For example, the processor 930i may provide one or more directed acyclic graphs to the scheduler 960 via the DAG memory 968. The scheduler 960 may initialize and/or configure the hardware engines 962a-962n in response to parsing the directed acyclic graphs. In some embodiments, the processor 930i may receive status information from the scheduler 960. For example, the scheduler 960 may provide a status information and/or readiness of outputs from the hardware engines 962a-962n to the processor 930i to enable the processor 930i to determine one or more next instructions to execute and/or decisions to make. In some embodiments, the processor 930i may be configured to communicate with the shared memory 964 (e.g., directly or through the scheduler 960, which receives data from the shared memory 964 via the path 966). The processor 930i may be configured to retrieve information from the shared memory 964 to make decisions. The instructions performed by the processor 930i in response to information from the computer vision processor 932i may be varied according to the design criteria of a particular implementation.

The circuit 970a may implement a convolution circuit. The convolution circuit 970a may be in communication with the memory 964 to receive input data and present the output data. The convolution circuit 970a is generally operational to fetch a plurality of data vectors from the shared memory circuit 964. Each data vector may comprise a plurality of the data values. The convolution circuit 970a may also be operational to fetch a kernel from the shared memory 964. The kernel generally comprises a plurality of kernel values. The convolution circuit 970a may also be operational to fetch a block from the shared memory 964 to an internal (or local) buffer. The block generally comprises a plurality of input tiles. Each input tile may comprise a plurality of input values in multiple dimensions. The convolution circuit 970a may also be operational to calculate a plurality of intermediate values in parallel by multiplying each input tile in the internal buffer with a corresponding one of the kernel values and calculate an output tile comprising a plurality of output values based on the intermediate values. In various embodiments, the convolution circuit 970a may be implemented solely in hardware. An example of a convolution calculation scheme that may be used to implement the circuit 970a may be found in U.S. Pat. No. 10,210,768, which is herein incorporated by reference in its entirety. The circuit 970b may implement an nD dot product process. The circuit 970n may implement a transcendental operation process. In various embodiments, an edge preserving noise reduction filtering scheme in accordance with embodiments of the invention may be performed according to implementation descriptions provided herein.

Figure 10:
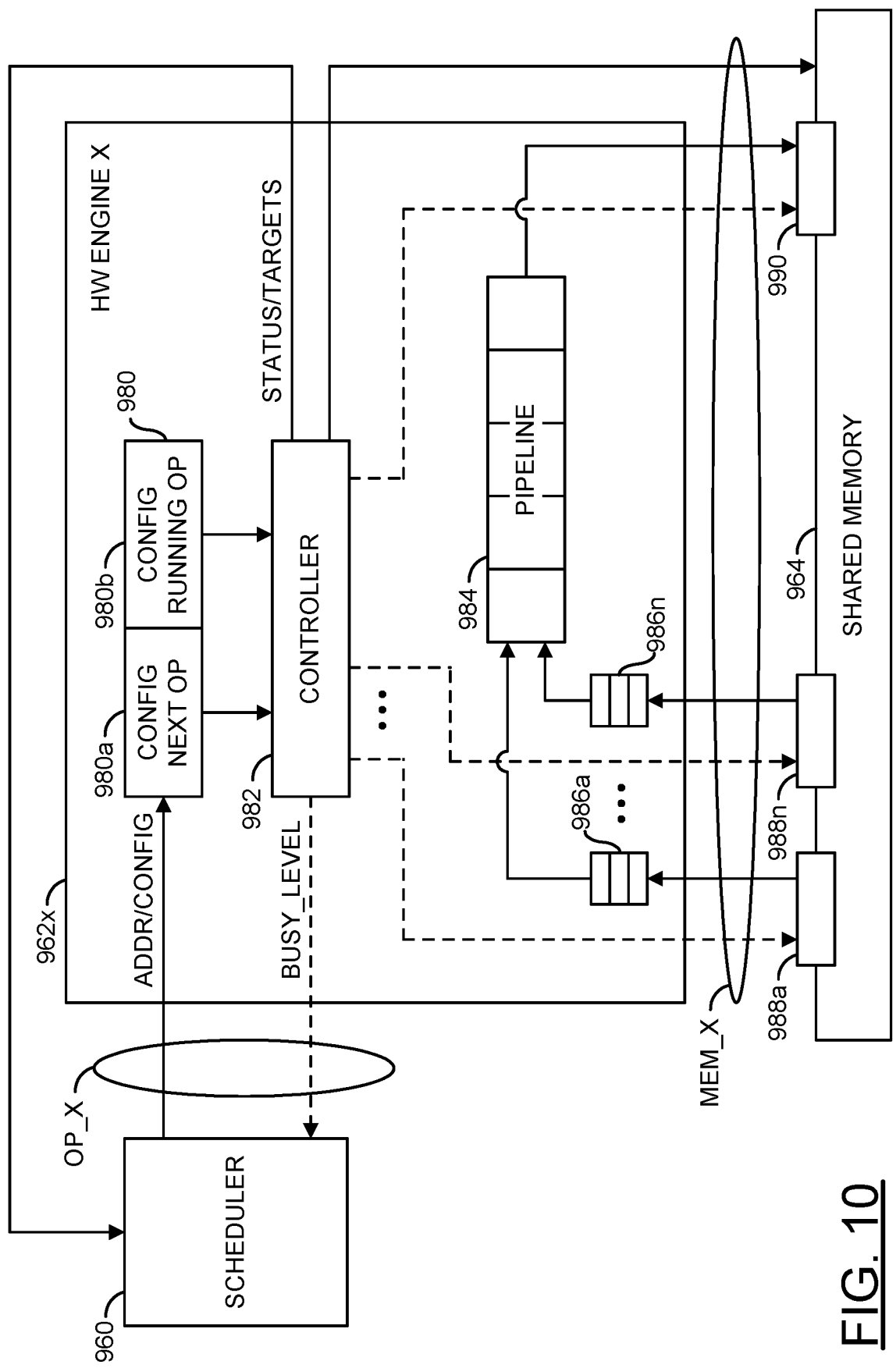
FIG. 10 is a diagram illustrating a generic implementation of a hardware engine of FIG. 9.

Referring to FIG. 10, a diagram illustrating an example implementation of a generic hardware engine 962x of FIG. 9 is shown. The hardware engine 962x may be representative of the hardware engines 962a-962n. The hardware engine 962x generally comprises a block (or circuit) 980, a block (or circuit) 982, a block (or circuit) 984, and a number of blocks (or circuits) 986a-986n. The circuit 980 may be implemented as a pair of memories (or buffers) 980a and 980b. The circuit 982 may implement a controller circuit. In an example, the circuit 982 may include one or more finite state machines (FSMs) configured to control various operators implemented by the hardware engine 962x. The circuit 984 may implement a processing pipeline of the hardware engine 962x. The circuits 986a-986n may implement first-in-first-out (FIFO) memories. The circuits 986a-986n may be configured as input buffers for the processing pipeline 984. The shared memory 964 may be configured (e.g., by signals from the circuit 982) as multiple shared input buffers 988a-988n and one or more output buffers 990.

A signal (e.g., ADDR/CONFIG) may be generated by the scheduler circuit 960 and received by the hardware engine 962x. The signal ADDR/CONFIG may carry address information and configuration data. A signal (e.g., BUSY LEVEL) may be generated by the circuit 982 and transferred to the scheduler circuit 960. The signal BUSY LEVEL may convey the busy level of the hardware engine 962x. A signal (e.g., STATUS/TARGETS) may be generated by the circuit 982 and transferred to the scheduler circuit 960. The signal STATUS/TARGETS may provide status information regarding the hardware engine 962x and target information for the operands.

In an example embodiment, the buffers 980a and 980b may be configured as a double-banked configuration buffer. The double-banked buffer may be operational to store configuration information for a currently running operation in one buffer (e.g., the buffer 980b) while configuration information for a next operation is being moved into the other buffer (e.g., the buffer 980a). The scheduler 960 generally loads operator configuration information, including status words in a case where the operator has been partially processed in previous operator chunks, into the double-banked buffer. Once the circuit 982 is finished with the configuration information of the running operation and the configuration information for the next operation has been received, the buffers 980a and 980b may swapped.

The circuit 982 generally implements the control circuitry of the hardware engine 962x. The circuit 982 determines when to switch from the currently running operator to the new operator. The controller 982 is generally operational to control the movement of information into, out of, and internal to the hardware engine 982x. In general, the operation of the hardware engine 962x is pipelined. During an operator switch, a front end of the pipeline 984 may already be working on data for the new operator while a tail-end of the pipeline 984 is still finishing up the processing associated with old operator.

The circuit 984 may implement a pipeline circuit. The pipeline circuit 984 is generally operational to process operands received from the shared memory 964 using functionality designed into the hardware engine 962x. The circuit 984 may communicate data resulting from the functions performed to the one or more shared buffers 990.

The buffers 986a-986n may implement FIFO buffers. The FIFO buffers 986a-986n may be operational to store operands received from the shared buffers 988a-988n for processing in the pipeline 984. In general, the number of FIFO buffers and the number of shared buffers implemented may be varied to meet the design criteria of a particular application.

The functions performed by and structures illustrated in the diagrams of FIGS. 1 to 10 may be designed, modeled, emulated, and/or simulated using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP), distributed computer resources, and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a memory configured to store image data of an image; and
a processor circuit configured to (a) copy the image data of said image from said memory to a first memory buffer of said processor circuit, (b) calculate first vector values for each pixel location in the image using the image data stored in the first memory buffer, (c) calculate second vector values for each pixel location in the image using the image data stored in the first memory buffer and the first vector values, (d) transform the image data stored in the first memory buffer by adding the second vector values to corresponding image data, (e) store the transformed image data to said memory, and (f) repeat steps (a) through (e) until the image data of said image has been transformed.

2. The apparatus according to claim 1, wherein said processor circuit is further configured to repeat steps (a) through (f) on said transformed image data for a predetermined number of iterations.

3. The apparatus according to claim 1, wherein said processor circuit is further configured to store the transformed image data in a second memory buffer for output as a result image.

4. The apparatus according to claim 1, wherein said processor circuit comprises a plurality of hardware engines configured to perform one or more operators.

5. The apparatus according to claim 4, wherein said one or more operators include a fast convolution operator, a multiply-add operator, and a transcendental operator.

6. The apparatus according to claim 5, wherein said processor circuit utilizes said fast convolution operator to perform gradient computations for calculating said first vector values for each location in the image.

7. The apparatus according to claim 5, wherein said processor circuit utilizes said multiply-add operator to perform element-wise multiplications and summations for calculating said first vector values for each location in the image.

8. The apparatus according to claim 5, wherein said processor circuit utilizes said transcendental operator to perform exponential and division computations for calculating said first vector values for each location in the image.

9. The apparatus according to claim 1, wherein said transformed image data has reduced noise and preserved object edges.

10. The apparatus according to claim 1, wherein said memory and said processor circuit are implemented as part of a camera system on chip.

11. The apparatus according to claim 1, wherein said image comprises at least one of a thermal image and a time-of-flight image.

12. A method of reducing noise in a captured image comprising the steps of:
copying image data of an image to a first memory buffer;
calculating first vector values for each pixel location in the image using the image data stored in the first memory buffer;

calculating second vector values for each pixel location in the image using the image data stored in the first memory buffer and the first vector values;

transforming the image data stored in the first memory buffer by adding the second vector values to corresponding image data; and storing the transformed image data in a second memory buffer for output as a result image.

13. The method according to claim 12, further comprising performing a predetermined number of iterations of calculating the first vector values for each pixel location in the image using the image data stored in the first memory buffer, calculating the second vector values for each location in the image using the image data stored in the first memory buffer and the first vector values, and transforming the image data stored in the first memory buffer by adding the second vector values to the corresponding image data.

14. The method according to claim 12, wherein transforming the image data stored in the first memory buffer by adding the second vector values to the corresponding image data reduces noise in the image data while preserving edges of objects.

15. The method according to claim 12, wherein transforming the image data stored in the first memory buffer by adding the second vector values to the corresponding image data reduces fixed pattern noise in the image data while preserving edges of objects.

16. The method according to claim 12, wherein said image comprises at least one of a thermal image and a time-of-flight image.

17. The method according to claim 12, wherein calculating said first vector values for each pixel location in the image using the image data stored in the first memory buffer comprises calculating gradient vector values for each pixel location in the image using the image data stored in the first memory buffer.

18. The method according to claim 17, wherein calculating said first vector values for each pixel location in the image using the image data stored in the first memory buffer further comprises calculating a sum of squares of the gradient vector values for each pixel location in the image stored in the first memory buffer.

19. The method according to claim 18, wherein calculating said first vector values for each pixel location in the image using the image data stored in the first memory buffer further comprises calculating a vector representing an inverse exponential function of the sum of the squares of the gradient vector values at each pixel location of the image.

* * * * *